US012621290B2

(12) United States Patent
Chen et al.

(10) Patent No.: US 12,621,290 B2
(45) Date of Patent: May 5, 2026

(54) METHOD FOR INTERFACING PASSENGER ELECTRONIC DEVICES WITH PASSENGER CONTROLLABLE FUNCTIONS AND AIRCRAFT CABIN NETWORK

(71) Applicant: Airbus Operations GmbH, Hamburg (DE)

(72) Inventors: Bing Chen, Hamburg (DE); Kai Möller, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 68 days.

(21) Appl. No.: 18/441,130

(22) Filed: Feb. 14, 2024

(65) Prior Publication Data

US 2024/0291810 A1 Aug. 29, 2024

(30) Foreign Application Priority Data

Feb. 28, 2023 (EP) ...................................... 23158976

(51) Int. Cl.
*G06F 15/16* (2006.01)
*H04L 9/40* (2022.01)
*H04L 67/12* (2022.01)

(52) U.S. Cl.
CPC ............ *H04L 63/083* (2013.01); *H04L 67/12* (2013.01)

(58) Field of Classification Search
CPC .............................. H04L 63/083; H04L 67/12
See application file for complete search history.

(56) References Cited

U.S. PATENT DOCUMENTS

| | | | |
|---|---|---|---|
| 10,778,667 B2 | 9/2020 | Muttik et al. | |
| 10,863,352 B2 | 12/2020 | Fischer et al. | |
| 2014/0053243 A1* | 2/2014 | Walsh | H04L 63/08 |
| | | | 726/4 |
| 2014/0187149 A1 | 7/2014 | Lortz et al. | |

(Continued)

FOREIGN PATENT DOCUMENTS

| | | |
|---|---|---|
| DE | 102012203032 A1 | 8/2013 |
| EP | 3182667 A1 | 6/2017 |

(Continued)

OTHER PUBLICATIONS

European Search Report for corresponding European Patent Application No. 23158976 dated Aug. 14, 2023.

(Continued)

*Primary Examiner* — Normin Abedin
(74) *Attorney, Agent, or Firm* — Greer Burns & Crain Ltd.

(57) ABSTRACT

A method for interfacing passenger electronic devices with passenger controllable functions involves transmitting, by a PED, a seat-based identification token to a cabin server of a passenger aircraft; requesting, by the cabin server in response to the transmission of the seat-based identification token, completion of a challenge presented by the cabin server by the user of the PED; upon successfully responding to the challenge, admitting, by the cabin server, access for the user of the PED to passenger controllable functions belonging to the passenger seat associated with the seat-based identification token transmitted by the PED; and accessing, by the user of the PED, the passenger controllable functions via remote control of the PED.

17 Claims, 1 Drawing Sheet

(56)        References Cited

U.S. PATENT DOCUMENTS

| | | | | |
|---|---|---|---|---|
| 2014/0282727 | A1* | 9/2014 | Keen ................. | H04N 21/4222 |
| | | | | 725/76 |
| 2014/0380501 | A1 | 12/2014 | Niss | |
| 2017/0182957 | A1* | 6/2017 | Watson ................ | H04L 67/125 |
| 2018/0075717 | A1* | 3/2018 | Reinbold ......... | H04N 21/41265 |
| 2018/0234707 | A1 | 8/2018 | Pujia et al. | |
| 2022/0312181 | A1* | 9/2022 | Sumien ............ | H04M 15/8351 |

FOREIGN PATENT DOCUMENTS

| | | | |
|---|---|---|---|
| EP | 3296205 | B1 | 3/2018 |
| WO | 2015163774 | A1 | 10/2015 |

OTHER PUBLICATIONS

R. God, et al., "Drahtlose Kommunikation in der Flugzeugkabine fur effiziente Arbeitsablaufe und Passagierdienstleistungen" MKWI 2010 Multikonferenz Wirtschaftsinformatik, Göttingen, Feb. 23-25, 2010, pp. 2361-2374.

* cited by examiner

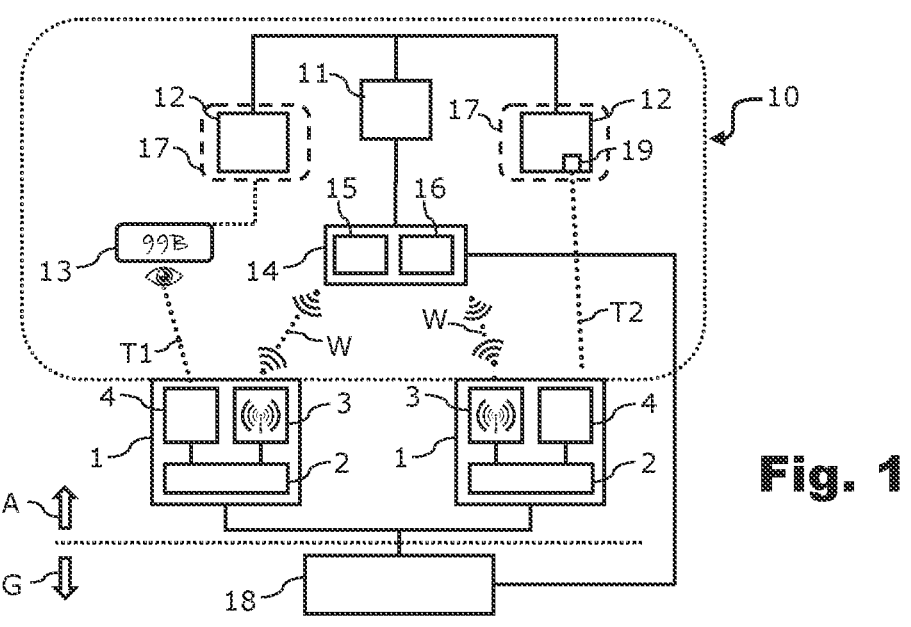
Fig. 1
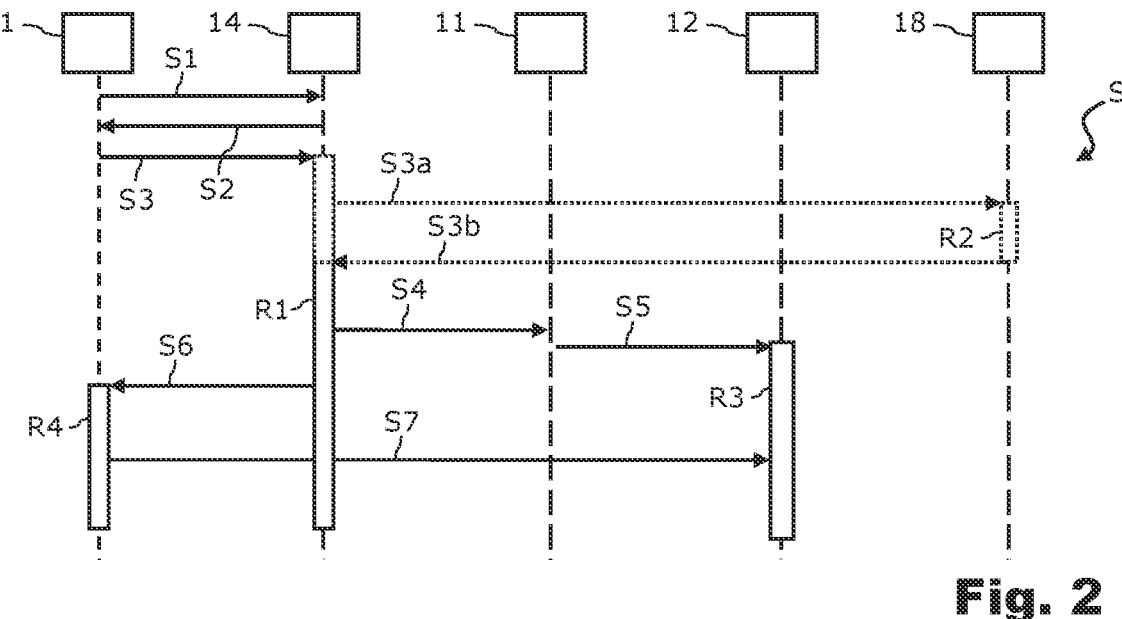
Fig. 2
Fig. 3
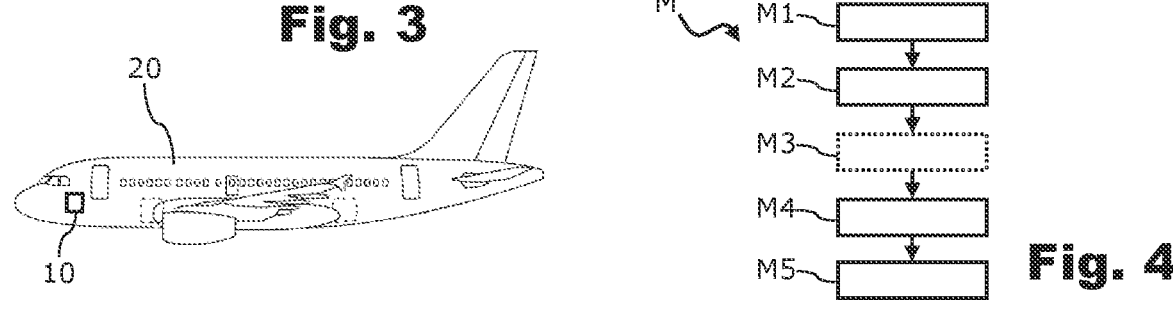
Fig. 4

METHOD FOR INTERFACING PASSENGER ELECTRONIC DEVICES WITH PASSENGER CONTROLLABLE FUNCTIONS AND AIRCRAFT CABIN NETWORK

CROSS-REFERENCES TO RELATED APPLICATIONS

This application claims the benefit of the European patent application No. 23158976.3 filed on Feb. 28, 2023, the entire disclosures of which are incorporated herein by way of reference.

FIELD OF THE INVENTION

The invention relates to methods for interfacing passenger electronic devices (PEDs) with passenger controllable functions, an aircraft cabin network for providing access of PEDs to passenger controllable functions and a passenger aircraft having such an aircraft cabin network.

BACKGROUND OF THE INVENTION

Personal electronic devices (PEDs) are nowadays ubiquitous. These PEDs are normally carried by the user wherever he travels, even on board aircraft. Considering the manifold communication interfaces of such PEDs it is desirable to provide passengers on board an aircraft with access to multiple services, for example an in-flight entertainment (IFE) system or a control network for controlling electronic passenger seat functions or passenger service units (PSU) including reading lights control, loudspeaker control, assistance call control and/or air condition vent control via the central wireless backbone.

Mobile content distribution networks on board of aircraft allow extending comfort amenities and services such as internet access, on-board shopping opportunities and access to in-flight entertainment (IFE) systems. In general, aircraft cabin networks enable a passenger to interface with passenger accessible cabin functions, increasing the comfort and content for the passenger, thereby adding a lot of value for an airline. For example, the document God, R; Hintze, H.: "Drahtlose Kommunikation in der Flugzeugkabine für effiziente Arbeitsabläufe und Passagierdienstleistungen", MKWI 2010 Multikonferenz Wirtschaftsinformatik, Göttingen, February 23-25, 2010, p. 2361-2374 discloses the use of non-contact aircraft cabin interfaces for network access of electronic devices employing smart card, RFID and near field communication (NFC) technology.

One of the challenges associated with managing network access to networks on board an aircraft pertains to the wide range of PEDs requesting access which are a priori not always known to the network. A network access control system therefore needs to employ elaborate access control schemes to be able to reliably identify and authenticate PEDs in order to selectively authorize and approve operations of the PEDs in the network and hold the authenticated user of the PEDs accountable for such operations.

Common measures for identification and authentication of an electronic device re-questing access to a network element involve the exchange of authentication codes between the device and the network element and the subsequent validation of the presented codes. Such codes may, for example, include knowledge-based passphrases (for example passwords, PIN codes or pre-assigned user information such as ticket or customer numbers), pre-validated information inherently tied to the device or tokens and fobs physically located in the vicinity of the device (for example a MAC address of the device or a digital authenticity certificate for the device), or inherent user-based coded parameters (for example, biometric user identification information such as fingerprints, retina patterns, DNA information or behavioral characteristics).

Several different approaches for access control procedures of electronic devices to network elements of vehicles are known in the prior art: Document DE 10 2012 203 032 A1 discloses an authentication method for an electronic device of an aircraft passenger based on flight specific pre-assigned authentication data. Document US 2014/0187149 A1 discloses the use of dynamically created uniform resources identifiers to redirect an electronic device to a remote authentication system for verifying access credentials of the electronic device to access a network element of a vehicle. Document WO 2015/163774 A1 discloses a multi-factor authentication scheme for access control of a user to a system based on acoustically convolved audio pass-phrases of different origin. EP 3 296 205 B1 discloses methods for controlling and connecting to cabin services within an aircraft, particularly passenger cabin services. EP 3 182 667 A1 discloses methods for wireless network access control on the basis of acoustic challenges in an aircraft.

SUMMARY OF THE INVENTION

One of the objects of the invention is to find solutions for more reliably providing connectivity of passengers' personal electronic devices to passenger accessible control functions in a passenger aircraft.

According to a first aspect of the invention, a method for interfacing passenger electronic devices (PEDs) with passenger controllable functions includes transmitting, by a PED, a seat-based identification token to a cabin server of a passenger aircraft; requesting, by the cabin server in response to the transmission of the seat-based identification token, completion of a challenge presented by the cabin server by the user of the PED; upon successfully responding to the challenge, admitting, by the cabin server, access for the user of the PED to passenger controllable functions belonging to the passenger seat associated with the seat-based identification token transmitted by the PED; and accessing, by the user of the PED, the passenger controllable functions via remote control of the PED.

According to a second aspect of the invention, an aircraft cabin network comprises a cabin server configured to, in response to the transmission of a seat-based identification token by a personal electronic device, PED, of a passenger of the passenger aircraft, request completion of a challenge presented by the cabin server by the user of the PED, to check whether the user of the PED successfully responded to the challenge and to, upon successfully responding to the challenge, admit access for the user of the PED to one of the plurality of passenger controllable functions belonging to the passenger seat associated with the seat-based identification token transmitted by the PED.

According to a third aspect of the invention, a passenger aircraft comprises a plurality of passenger seats uniquely identifiable via seat-based identification tokens, such as for example barcodes, QR codes, pictographic or alphanumeric identification representations, or invisible codes or patterns embedded in smart fabrics or dyes, and an aircraft cabin network according to the second aspect of the invention.

An important idea of the invention involves introducing a multi-factor authentication mechanism that enables an aircraft cabin network to uniquely and more reliably identify electronic devices of individual passengers who want to interact with aircraft cabin core systems in order to gain remote access to passenger controllable functions, for example passenger seat control functions. The passenger may connect with his/her own device to the respective aircraft systems using either native application software on the device or web-based application programming interfaces (APIs) that provide publicly exposed web endpoints to a pre-defined request-response messaging system.

One of the advantages of using multi-factor authentication over single-factor authentication is that the risk of maliciously motivated or unintended faulty pairing and therefore unwarranted remote controlling of aircraft cabin systems by unauthorized devices may be significantly reduced.

According to some embodiments of the first aspect of the invention, the method may further include determining, by the cabin server, whether the response of the PED has been successful on the basis of verification information retrieved by the cabin server from a ground-based server. In several embodiments thereof, the verification information includes at least one of a passenger name, a QR code bound to the boarding pass, a barcode bound to the boarding pass, a challenge code from an e-ticket, and a code sent via short messaging system to the PED. Such verification information may be transmitted by the ground-based server to the cabin server prior to boarding of the passenger aircraft of the user of the PED.

According to some further embodiments of the first aspect of the invention, the seat-based identification token may include at least one of a printed barcode, a QR code, pictographic or alphanumeric identification representations, or invisible codes or patterns embedded in smart fabrics or dyes.

According to some further embodiments of the first aspect of the invention, the challenge presented by the cabin server may include at least one of an individual code displayed on a passenger service unit associated with the passenger seat, an individual code provided via a near-field communication interface at the passenger seat, and an individual code displayed on an in-seat display of the passenger seat.

According to some further embodiments of the first aspect of the invention, the passenger controllable functions may include at least one of wireless local area network access points, in-flight entertainment system components such as a media display, loudspeakers and headphone interfaces, electric power supply components such as USB ports and power outlet sockets, seat control components for controlling electronic passenger seat functions such as electrical actuators for changing the seat configuration, and overhead passenger service units, PSU, including reading lights control, loudspeaker control, assistance call control and/or air condition vent control.

According to some further embodiments of the first aspect of the invention, the step of accessing, by the user of the PED, the passenger controllable functions may be performed using a web application or a native application, for example being connected to one of a plurality of web sockets for interfacing with the web applications of the PEDs of a web server implemented in the cabin server.

According to some embodiments of the second aspect of the invention, the cabin server may further be configured to determine whether the response of the PED has been successful on the basis of verification information retrieved by the cabin server from a ground-based server. In several embodiments thereof, the verification information includes at least one of a passenger name, a QR code bound to the boarding pass, a barcode bound to the boarding pass, a challenge code from an e-ticket, and a code sent via short messaging system to the PED.

According to some further embodiments of the second aspect of the invention, the seat-based identification token may include at least one of a printed barcode, a QR code, pictographic or alphanumeric identification representations, or invisible codes or patterns embedded in smart fabrics or dyes.

According to some further embodiments of the second aspect of the invention, the aircraft cabin network further comprises a number of passenger controllable functions belonging to a plurality of passenger seats in a passenger aircraft each. The passenger controllable functions may include at least one of wireless local area network access points, in-flight entertainment system components such as a media display, loudspeakers and headphone interfaces, electric power supply components such as USB ports and power outlet sockets, seat control components for controlling electronic passenger seat functions such as electrical actuators for changing the seat configuration, and overhead passenger service units, PSU, including reading lights control, loudspeaker control, assistance call control and/or air condition vent control.

The above configurations and developments can be combined with one another in any desired manner, if useful. Further possible configurations, developments and implementations of the invention also comprise combinations, not explicitly mentioned, of features of the invention described above or below with respect to the exemplary embodiments. In particular, in this case, a person skilled in the art will also add individual aspects as improvements or additions to the respective basic form of the present invention.

BRIEF DESCRIPTION OF THE DRAWINGS

The present invention is explained in more detail below on the basis of the exemplary embodiments indicated in the schematic figures, in which:

FIG. 1 shows a schematic block diagram of personal electronic devices (PEDs) connecting to an aircraft cabin network of a passenger aircraft according to some embodiments of the invention;

FIG. 2 shows a schematic signal flow diagram between a personal electronic device (PED) and components of an aircraft cabin network of a passenger aircraft according to some embodiments of the invention;

FIG. 3 shows a schematic illustration of an aircraft having an aircraft cabin network according to FIG. 1 according to a further embodiment of the invention; and FIG. 4 shows a schematic flowchart of the steps of a method for interfacing passenger electronic devices (PEDs) with passenger controllable functions in a passenger aircraft according to some further embodiments of the invention.

DETAILED DESCRIPTION OF THE PREFERRED EMBODIMENTS

The accompanying figures are intended to impart a further understanding of the embodiments of the invention. They illustrate embodiments and are used, in conjunction with the description, to explain principles and concepts of the invention. Other embodiments and many of the advantages mentioned are evident in view of the drawings. The elements in the drawings are not necessarily shown in a manner true to scale with respect to one another. Direction-indicating terminology, for instance "at the top", "at the bottom", "on the left", "on the right", "above", "below", "horizontal", "vertical", "at the front", "at the rear" and similar statements are used merely for explanatory purposes and are not used to restrict the generality to specific configurations as shown in the figures.

In the figures of the drawing, identical, functionally identical and identically acting elements, features and components are each provided with the same reference signs, unless stated otherwise.

Personal electronic devices (PEDs) in the sense of this invention comprise all electronic devices which can be used for entertainment, communication and/or office purposes. For example, PEDs may comprise all types of terminals such as laptops, mobile telephones, smartphones, handheld devices, palmtops, tablet PCs, GPS devices, navigation devices, audio devices such as MP3 players, portable DVD or Bluray® players or digital cameras.

FIG. 1 schematically illustrates a functional diagram of an aircraft cabin network 10. The aircraft network cabin 10 may be installed in an aircraft, for example a passenger aircraft 20 as illustrated in FIG. 3. The aircraft cabin network 10 may, for example, be a microprocessor controlled data bus system for the control and operation of cabin core functions. The aircraft cabin network 10 may include components that allow a passenger to interface with cabin core functions such as, for example, in-flight entertainment (IFE) system components such as a media display, loudspeakers and headphone interfaces, electric power supply components such as USB ports and power outlet sockets, seat control components for controlling electronic passenger seat functions such as electrical actuators for changing the seat configuration, or overhead passenger service units (PSU) including reading lights control, loudspeaker control, assistance call control and/or air condition vent control via a central wireless backbone.

The passenger seats 17 may be installed in a passenger aircraft, for instance the aircraft 20 schematically illustrated in FIG. 3. In this case, a passenger aircraft A may comprise different passenger seat assemblies including various passenger seats 17, which passenger seat assemblies are fixedly or permanently installed in a passenger cabin, for example, using one or more seat fastening rails running in the passenger cabin floor.

The passenger seats 17 may have, for example, a seating surface and a backrest hinged to the seating surface. In this case, the passenger seats may be arranged beside one another, for example, that is to say, with seating surfaces adjoining one another laterally, with the result that a plurality of passengers may simultaneously each occupy one passenger seat 17 in a passenger seat assembly.

Each passenger seat 17 is equipped with or otherwise tied to one or more cabin control function modules 12, for example in-flight entertainment (IFE) system components such as a media display, loudspeakers and headphone interfaces, electric power supply components such as USB ports and power outlet sockets, seat control components for controlling electronic passenger seat functions such as electrical actuators for changing the seat configuration, or overhead passenger service units (PSU) including reading lights control, loudspeaker control, assistance call control and/or air condition vent control. The cabin control function modules 12 may be integrated into a single physical module such as a PSU or may be dispersed in the vicinity of the passenger seat, only collectively to be referred to as cabin control function modules 12.

Passengers on an aircraft may bring personal electronic devices (PEDs) on board of the aircraft. Exemplarily, two PEDs 1 are shown in FIG. 1, however, any number of PEDs 1 may be used in conjunction with the aircraft cabin network 10, depending on the number of passengers, the type of aircraft and the corresponding number of passengers seats 17 in the respective aircraft. Those PEDs 1 may be used as main interface to aircraft cabin systems for remote control of passenger controllable functions. As the specific PEDs are in most cases not known to the aircraft cabin network 10 in advance, the PEDs 1 usually need to be connected to the aircraft cabin network 10 after boarding of the passengers.

A single information item, such as, for example, the seat number, may easily be spoofed by a passenger passing by a seat that is not attributed to him/her on this particular flight. Alternatively, passengers may mistakenly use wrong seat information items while trying to connect the aircraft cabin network 10. Thus, remote control of passenger seat control functions may be erroneously assigned to unauthorized PEDs which may cause annoyance to other passengers and may lower the reputation of the airline. Additionally, unauthorized or erroneous remote control of assistance calls may lead to additional workload for the aircraft crew members and potential safety issues. Thus, the implementation of a multi-factor authentication mechanism reduces the probability of information spoofing and erroneous or unintended faulty device pairing to passenger seats.

FIG. 2 shows a schematic signal flow diagram S of a procedure for granting access of a passenger's personal electronic device (PED) to components of an aircraft cabin network, such as, for example, the aircraft cabin network 10 as depicted in and explained in conjunction with FIG. 1. The procedure may be employed to identify and authenticate a PED of a passenger who requests access to an aircraft cabin network in order to be able to interface with seat-specific control functions at or in the vicinity of his/her passenger seat, for example in a passenger aircraft 20 as depicted in and explained in conjunction with FIG. 3. The signal flow diagram S may be, in particular, a possible basis for the steps of the method M as depicted in and explained in conjunction with FIG. 4.

A number of PEDs 1—of which two are exemplarily depicted in FIG. 1—having a processing unit 2, a wireless communication module 3 and an application software 4, such as a native application or a web application, are trying to gain access to seat-specific control functions, such as, for example, the passenger seat control functions 12 illustrated in FIG. 1. The user of a PED 1 first gathers information T1 from a seat-based identification token associated with a passenger seat 17 which he is assigned to in the passenger aircraft 20. The seat-based identification token may, for example, include at least one of a printed barcode, a QR code, pictographic or alphanumeric identification representation, or invisible codes or patterns embedded in smart fabrics or dyes used for the parts of the seats or decorative elements in the vicinity of the seats. Such seat-based identification tokens may be static information attached to a label plate or printed on a part of the passenger seat 17.

Referring back to FIG. 2, in a signal flow S1, the PED 1 transmits the seat-based identification token to the cabin server 14 via a wireless communication channel W. In response thereto, the cabin server 14 requests in a signal flow S2 the completion of a challenge from the user of the PED 1. Such a challenge may involve requesting providing a passenger name, a QR code bound to the boarding pass, a barcode bound to the boarding pass, a challenge code from an e-ticket, or a code sent via short messaging system to the PED 1. Alternatively, the challenge presented by the cabin server 14 may include displaying an individual code on a passenger service unit associated with the passenger seat 17 for the user of the PED 1 to read and transmit back to the cabin server 14. In other cases, an individual code may be provided via a near-field communication (NFC) interface 19 at the passenger seat 17 so that the user of the PED 1 may initiate a seat-specific pairing event T2 with the NFC function of his/her PED 1. Finally, the cabin server 14 may instruct an in-flight entertainment system of the aircraft cabin network 10 to display an individual code on an in-seat display of the respective passenger seat 17 for the user of the PED 1 to read and transmit back to the cabin server 14.

The response to the challenge is sent by the PED 1 back to the cabin server 14 in a signal flow S3. In a connected mode for the PED 1, the completion of the challenge may be double-checked by the cabin server 14 using verification information R2 retrieved by the cabin server 14 from a ground-based server 18. The ground-based server 18 may be outside the aircraft area A and may be located on the ground G, for example at an airline facility or at an airport. To that end, the cabin server 14 may poll the ground-based server 18 in a signal flow S3*a* which returns a signal flow S3*b* signaling to the cabin server 14 whether the response of the PED 1 has been successful. Alternatively to the polling steps S3*a* and S3*b*, the verification information may already have been transmitted by the ground-based server 18 to the cabin server 14 prior to boarding of the passenger aircraft 20 of the user of the PED 1, for example in a batch including all passengers that are to be boarding the particular passenger aircraft 20.

If the cabin server 14 is not able to double-check the response to the challenge with externally verified verification information, the PED 1 may be put in a local mode. The local mode may have more severe restrictions in the access to the passenger controllable functions 12 than the connected mode. In any case, the status R1 of the PED 1 is set in the cabin server 14 as verified.

The cabin server 14 then instructs a cabin control system 11 in a signal flow S4 to provide remote access of the PED 1 to passenger controllable functions 12. The cabin control system 11, in turn, transmits a signal flow S5 to the respective passenger seat control module which turns its status R3 to access-ready for the respective PED 1. The cabin server 14 then notifies the PED 1 in a signal flow S6 of the access-ready status R4 so that the user of the PED 1 is then able to access the passenger controllable functions 12 via remote control of the PED 1 in one or more signal flows S7.

FIG. 4 shows a flowchart of method steps of a method M for interfacing passenger electronic devices (PEDs) with passenger controllable functions in a passenger aircraft, for example the passenger aircraft 20 of FIG. 3. The method M may be carried out as explained and shown in connection with the aircraft cabin network 10 of FIG. 1 and the concomitant signal flow diagram S of FIG. 2.

In a first step M1, a PED 1 transmits a seat-based identification token to a cabin server 14 of a passenger aircraft 20. The seat-based identification token may, for example, include at least one of a printed barcode, a QR code, a pictographic or alphanumeric identification representation, or invisible codes or patterns embedded in smart fabrics or dyes. Such seat-based identification tokens may be static information attached to a label plate or printed on a part of the passenger seat 17.

In a second step M2, the cabin server 14 requests from the user of the PED 1, in response to the transmission of the seat-based identification token, the completion of a challenge. Such a challenge may involve requesting providing a passenger name, a QR code bound to the boarding pass, a barcode bound to the boarding pass, a challenge code from an e-ticket, of a code sent via short messaging system to the PED 1. In a connected mode for the PED 1, the completion of the challenge may be double-checked by the cabin server 14 using verification information retrieved by the cabin server 14 from a ground-based server 18. This optional third step M3 involves determining, by the cabin server 14, whether the response of the PED 1 has been successful on the basis of the verification information retrieved by the cabin server 14 from a ground-based server 18. The verification information may, in particular, be transmitted by the ground-based server 18 to the cabin server 14 prior to boarding of the passenger aircraft 20 of the user of the PED 1.

Alternatively, the PED 1 may be put in a local mode, in which the cabin server 14 is not able to double-check the response to the challenge with externally verified verification information. The local mode may have more severe restrictions in the access to the passenger controllable functions 12 than the connected mode. For example, the challenge presented by the cabin server 14 may include displaying an individual code on a passenger service unit associated with the passenger seat 17 for the user of the PED 1 to read and transmit back to the cabin server 14. In other cases, an individual code may be provided via a near-field communication (NFC) interface at the passenger seat 17 so that the user of the PED 1 may initiate a seat-specific pairing event with the NFC function of his/her PED 1. Finally, the cabin server 14 may instruct an in-flight entertainment system of the aircraft cabin network 10 to display an individual code on an in-seat display of the respective passenger seat 17 for the user of the PED 1 to read and transmit back to the cabin server 14.

Upon successfully responding to the challenge, the cabin server 14 admits, in a fourth step M4, access for the user of the PED 1 to passenger seat control functions 12 belonging to the passenger seat 17 associated with the seat-based identification token transmitted by the PED 1. The user of the PED 1 is then able, in a fifth step M5 to access the passenger controllable functions 12 via remote control of the PED 1, for example using a native application or a web application that interfaces with one of a plurality of web sockets 16 of a web server 15 implemented in the cabin server 14. The passenger controllable functions 12 that the user of the PED 1 is able to access may include in-flight entertainment system components such as a media display, loudspeakers and headphone interfaces, electric power supply components such as USB ports and power outlet sockets, seat control components for controlling electronic passenger seat functions such as electrical actuators for changing the seat configuration, and overhead passenger service units, PSU, including reading lights control, loudspeaker control, assistance call control and/or air condition vent control via a central wireless backbone.

In the detailed description above, various features have been combined in one or more examples in order to improve the rigorousness of the illustration. However, it should be clear in this case that the above description is of a merely illustrative but in no way restrictive nature. It is used to cover all alternatives, modifications and equivalents of the various features and exemplary embodiments. Many other examples will be immediately and directly clear to a person skilled in the art on the basis of his technical knowledge in view of the above description.

The exemplary embodiments were selected and described in order to be able to present the principles on which the invention is based and their possible uses in practice in the best possible manner. As a result, experts can optimally modify and use the invention and its various exemplary embodiments with regard to the intended purpose. In the claims and the description, the terms "containing" and "having" are used as neutral linguistic concepts for the corresponding term "comprising".

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for interfacing passenger electronic devices, PEDs, with passenger controllable functions, the method comprising:

transmitting, by a PED, a seat-based identification token to a cabin server of a passenger aircraft;

requesting, by the cabin server in response to a transmission of the seat-based identification token, completion of a challenge presented by the cabin server by a user of the PED;

determining, by the cabin server, an access level of the PED based on a response to the challenge by the PED, the access level being a local mode when the response to the challenge was unsuccessful or a connected mode when the response to the challenge was successful; and upon the user successfully responding to the challenge, admitting, by the cabin server, access for the user of the PED to passenger controllable functions belonging to a passenger seat associated with the seat-based identification token transmitted by the PED associated with the access level.

2. The method according to claim 1, further comprising determining, by the cabin server, whether the response of the PED has been successful based on verification information retrieved by the cabin server from a ground-based server.

3. The method according to claim 2, wherein the verification information includes at least one of a passenger name, a QR code bound to the boarding pass, a barcode bound to a boarding pass, a challenge code from an e-ticket, or a code sent via short messaging system to the PED.

4. The method according to claim 3, wherein the verification information is transmitted by the ground-based server to the cabin server prior to boarding of the passenger aircraft of the user of the PED.

5. The method according to claim 1, wherein the seat-based identification token is selected from a group consisting of: a printed barcode, a QR code, pictographic or alphanumeric identification representations, invisible codes or patterns embedded in smart fabrics or dyes, and any combination thereof.

6. The method according to claim 1, wherein the challenge presented by the cabin server includes at least one of an individual code displayed on a passenger service unit associated with the passenger seat, an individual code provided via a near-field communication interface at the passenger seat, and an individual code displayed on an in-seat display of the passenger seat.

7. The method according to claim 1, wherein the passenger controllable functions include at least one of in-flight entertainment system components such as a media display, loudspeakers and headphone interfaces, electric power supply components such as USB ports and power outlet sockets, seat control components for controlling electronic passenger seat functions such as electrical actuators for changing a seat configuration, and overhead passenger service units, PSU, including at least one of reading lights control, loudspeaker control, assistance call control or air condition vent control.

8. The method according to claim 1, wherein accessing, by the user of the PED, the passenger controllable functions are performed using a web application or a native application.

9. The method according to claim 8, wherein the cabin server includes a web server having a plurality of web sockets for interfacing with the web applications of the PEDs.

10. The method according to claim 1, wherein the access level associated with the local mode is more restricted than the access level associated with the connected mode.

11. An aircraft cabin network, comprising:

a cabin server configured to, in response to a transmission of a seat-based identification token by a personal electronic device, PED, of a passenger of a passenger aircraft, request completion of a challenge presented by the cabin server by a user of the PED, check whether the user of the PED successfully responded to the challenge, determine an access level of the PED based on the response to the challenge by the PED, the access level being a local mode when the response to the challenge was unsuccessful or a connected mode when the response to the challenge was successful, and upon successfully responding to the challenge, admit access for the user of the PED to one of a plurality of passenger controllable functions belonging to a passenger seat associated with the seat-based identification token transmitted by the PED associated with the access level.

12. The aircraft cabin network according to claim 11, wherein the cabin server is further configured to determine whether the response of the PED has been successful based on verification information retrieved by the cabin server from a ground-based server.

13. The aircraft cabin network according to claim 12, wherein the verification information includes at least one of a passenger name, a QR code bound to a boarding pass, a barcode bound to the boarding pass, a challenge code from an e-ticket, and a code sent via short messaging system to the PED.

14. The aircraft cabin network according to claim 11, wherein the seat-based identification token is selected from a group consisting of: a printed barcode, a QR code, pictographic or alphanumeric identification representations, invisible codes or patterns embedded in smart fabrics or dyes, and any combination thereof.

15. The aircraft cabin network according to claim 11, further comprising:

a number of passenger controllable functions belonging to a plurality of passenger seats in a passenger aircraft the passenger controllable functions including at least one of in-flight entertainment system components comprising a media display, loudspeakers and headphone interfaces, electric power supply components comprising USB ports and power outlet sockets, seat control components for controlling electronic passenger seat functions comprising electrical actuators for changing the seat configuration, and overhead passenger service units, PSU, comprising at least one of reading lights control, loudspeaker control, assistance call control or air condition vent control.

16. A passenger aircraft comprising:

a plurality of passenger seats uniquely identifiable via seat-based identification tokens; and an aircraft cabin network according to claim 11.

17. A method for interfacing passenger electronic devices, PEDs, with passenger controllable functions, the method comprising:

transmitting, by a PED, a seat-based identification token to a cabin server of a passenger aircraft associated with a passenger seat, wherein the seat-based identification token includes invisible codes or patterns embedded in smart fabrics or dyes disposed on the passenger seat or in the vicinity of the passenger seat;

requesting, by the cabin server in response to a transmission of the seat-based identification token, completion of a challenge presented by the cabin server by a user of the PED;

determining, by the cabin server, an access level of the PED based on a response to the challenge by the PED, the access level being a local mode when the response to the challenge was unsuccessful or a connected mode when the response to the challenge was successful; and upon the user successfully responding to the challenge, admitting, by the cabin server, access for the user of the PED to passenger controllable functions belonging to the passenger seat associated with the seat-based identification token transmitted by the PED associated with the access level.

* * * * *